United States Patent [19]
Mylrea et al.

[11] Patent Number: 4,708,564
[45] Date of Patent: Nov. 24, 1987

[54] PALLETIZING APPARATUS

[75] Inventors: William J. Mylrea, Denver; Gerald C. Thompson, Broomfield, both of Colo.

[73] Assignee: Master Conveyor Corporation, Englewood, Colo.

[21] Appl. No.: 882,269

[22] Filed: Jul. 7, 1986

[51] Int. Cl.$^4$ .............................................. B65G 57/24
[52] U.S. Cl. ......................................... 414/36; 414/82; 414/85; 414/903; 414/907
[58] Field of Search ....................... 414/76, 80, 82, 83, 414/85, 903, 907, 36; 271/189

[56] References Cited

U.S. PATENT DOCUMENTS

| | | | |
|---|---|---|---|
| 2,084,741 | 6/1937 | Price | 271/189 |
| 3,135,150 | 6/1964 | Raynor | 414/85 X |
| 3,157,294 | 11/1964 | Bolt | 414/85 |
| 3,756,427 | 9/1973 | Arnemann | 414/82 |
| 3,941,048 | 3/1976 | Oe et al. | 414/82 X |
| 4,271,755 | 6/1981 | Kintgen et al. | 414/82 X |

FOREIGN PATENT DOCUMENTS

| | | | |
|---|---|---|---|
| 2124177 | 11/1972 | Fed. Rep. of Germany | 414/82 |
| 59-39628 | 3/1984 | Japan | 414/80 |
| 537899 | 1/1977 | U.S.S.R. | 271/189 |

Primary Examiner—Leslie J. Paperner
Attorney, Agent, or Firm—Senninger, Powers, Leavitt and Roedel

[57] ABSTRACT

Palletizing apparatus having an air table pivoted on a compression plate, the table being swung up to a raised inclined position for receiving bags to be stacked on a pallet from an infeed conveyor with the bags arranged in a layer on the table, and swung down to a lowered position and moved to a retracted position below the conveyor for withdrawing the table from under the layer of bags for deposit of the layer to form the stack on the pallet, the pallet being held on an elevator, the bags on the pallet being compressible against the bottom of the compression plate by raising the elevator, and a pallet magazine below the conveyor from which a pallet is transferred to the elevator on each cycle of the apparatus for the stacking of bags on the pallet.

8 Claims, 8 Drawing Figures

PALLETIZING APPARATUS

BACKGROUND OF THE INVENTION

This invention relates to palletizing apparatus and more particularly to apparatus for stacking items such as filled bags on pallets.

The invention is in the same general field as the apparatus of U.S. Pat. No. 4,271,755 of Dale I. Kintgen, William J. Mylrea and William A. Smith entitled Bag Handling Apparatus, issued June 9, 1981, assigned to Master Conveyor Corporation, assignee of this application, said patent being incorporated herein by reference.

BRIEF SUMMARY OF THE INVENTION

Among the several objects of this invention may be noted the provision of apparatus for stacking items, particularly filled bags, on pallets, which apparatus is of relatively economical construction and relatively economical to operate, particularly in respect to maintenance requirements.

In general, apparatus of this invention, which is operable to stack items on pallet in layers each comprising a plurality of items, comprises an air table having a forward and a rearward end, and a conveyor for delivering items to the air table over the rearward end of the table for arranging items in a layer on the table. Supporting means for the table and the table are movable relative to the conveyor between an advanced position wherein the table extends forward from one end of the conveyor constituting its exit end with the rearward end of the table adjacent the exit end of the conveyor, and a retracted position wherein the table is below the conveyor, means being provided for moving the supporting means and the table between said positions. Means pivotally mounts the table on said supporting means for swinging of the table on a generally horizontal transverse axis relative to said supporting means, when the table is in its said advanced position, between a raised position inclined upwardly toward said exit end of the conveyor and generally at the level of the conveyor for receiving items from the conveyor, and a lowered position wherein the table is below the conveyor for the retraction of said supporting means and table below the conveyor, means being provided for effecting raising and lowering of the table. The table is withdrawn from under the layer of items thereon when lowered and moved back from its advanced to its retracted position. And the apparatus further comprises means for holding a pallet and layers of items stacked thereon below the advanced position of the supporting means and table, the first layer of items which is arranged on the table being deposited on a pallet held by this pallet holding means when the table is withdrawn and each successive layer being deposited on the preceding layer on the pallet when the table is withdrawn.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION

Referring to the drawings, a palletizing apparatus of this invention is shown to comprise an air table 1 on which, in successive cycles of operation of the apparatus, items each designated 3 are arranged in a desired pattern in a layer 5. The table is one on which the items are adapted freely to slide, more particularly an air table. As herein disclosed, items 3 are filled bags, a layer 5 comprising five bags which may be arranged in different patterns as is well known in the art, one such pattern being shown in FIG. 6. The air table 1 is essentially a shallow rectangular hollow box having a top 7, bottom 9, sides each designated 11, and ends 13 and 15, the end 13 being referred to as the rearward end and the end 15 as the forward end of the table. The terms "forward" and "rearward" are used in the sense of the direction of delivery of the bags to the table by a conveyor 17, the bags being delivered to the table over the rearward end 13 of the table by the conveyor and sliding forward over the table toward its forward end 15, as will appear. The table top 7 has holes 19 therein for exit of air therefrom, air being supplied to the interior of the table as will be subsequently described in detail, for air flotation of the bags on the table for anti-friction sliding of the bags over the table.

Figure 1:
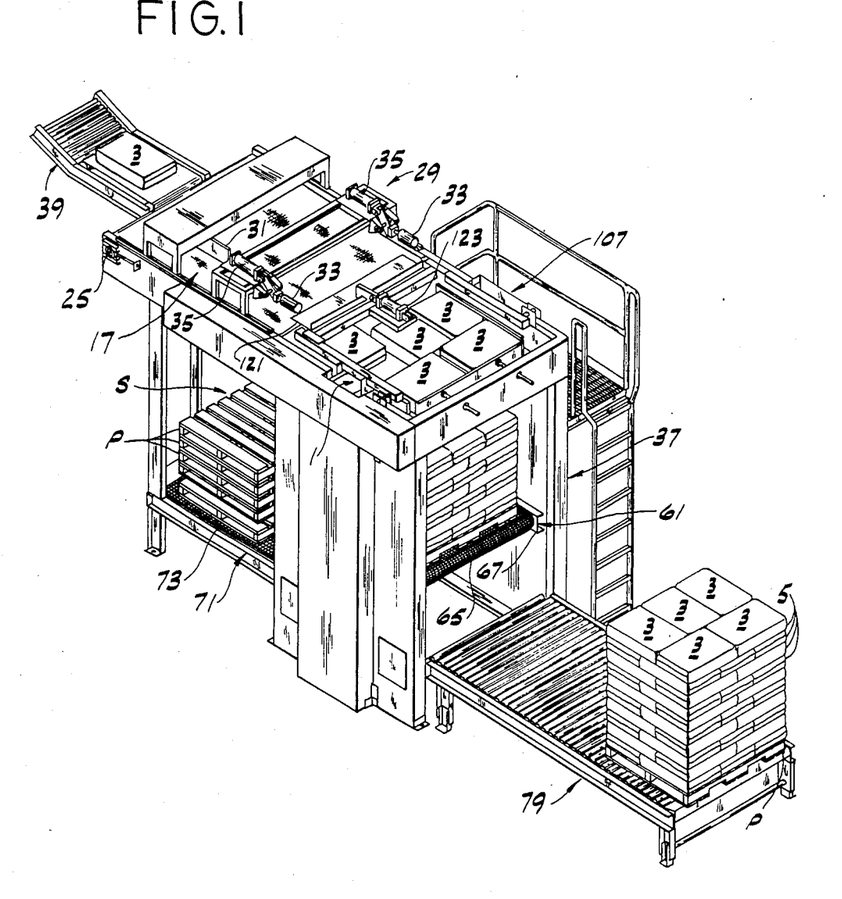
FIG. 1 is a perspective of a palletizing apparatus of this invention.
Figure 2:
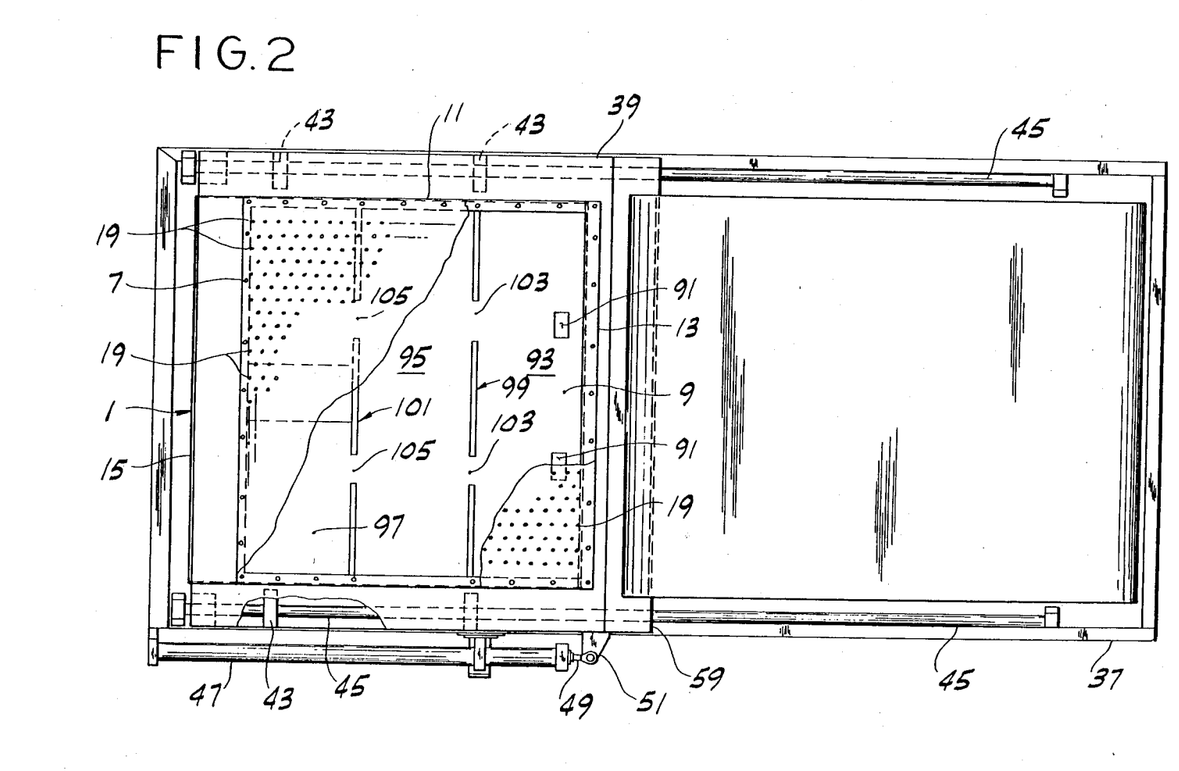
FIG. 2 is a partial plan of the apparatus, with parts omitted and parts broken away.
Figure 6:
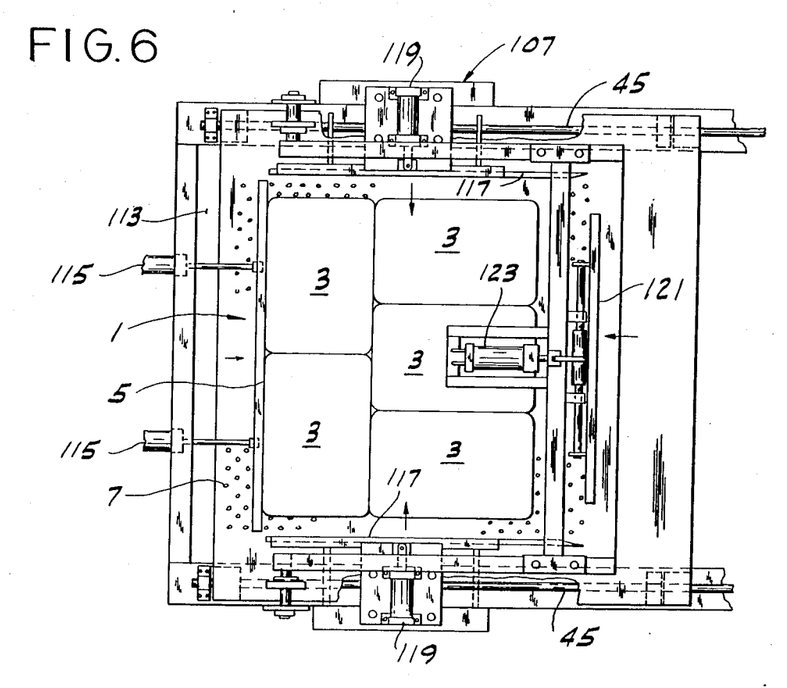
FIG. 6 is a plan showing the air table with a layer of bags thereon and showing means for squaring layers of bags on the table.

The conveyor 17, as illustrated, is an endless belt conveyor comprising a belt 21 trained around a set of rolls including a forward or exit end roll 23 and a rearward or entrance end roll 25, the rolls being so arranged that the belt has an upper generally horizontal forwardly movable reach 21a and a lower return reach 21b below the upper reach. Suitable means such as indicated generally at 27 is provided for intermittently driving the belt. Means such as indicated generally at 29 is provided above the upper reach 21a of the belt 21 for channelling and turning bags moving forward on the upper reach to form the desired pattern of bags on the air table 1. Such channelling and turning means is well known in the art and it will suffice to say that, as illustrated in FIGS. 1, and 6, it generally comprises a bag channelling guide 31 movable laterally with respect to the conveyor and bag turning bars 33 at opposite sides swingable up and down by air cylinders 35.

Figure 3:
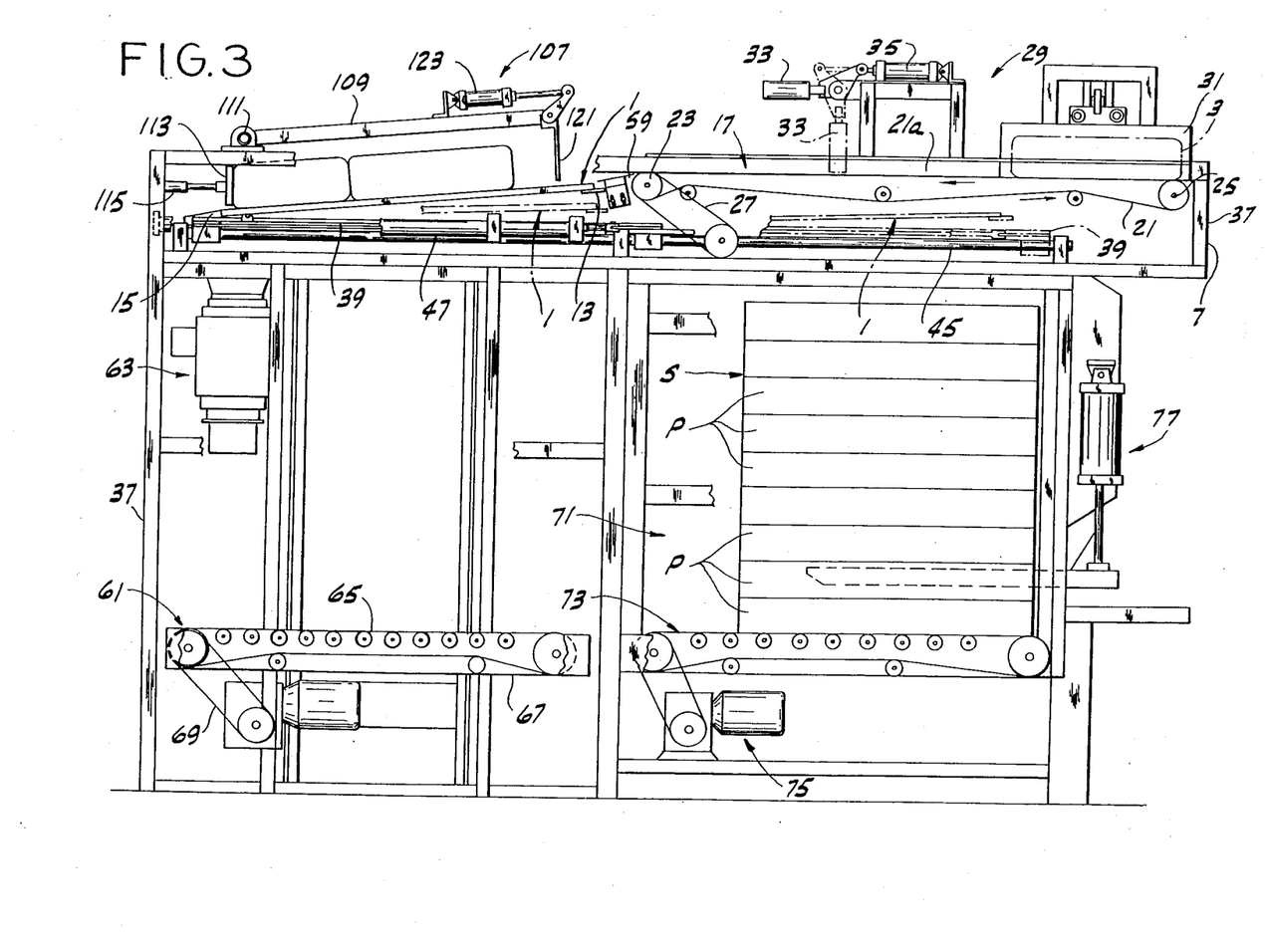
FIG. 3 is a side elevation of the apparatus, showing the air table thereof in its advanced and raised loading position, and showing an elevator of the apparatus in lowered position.
Figure 5:
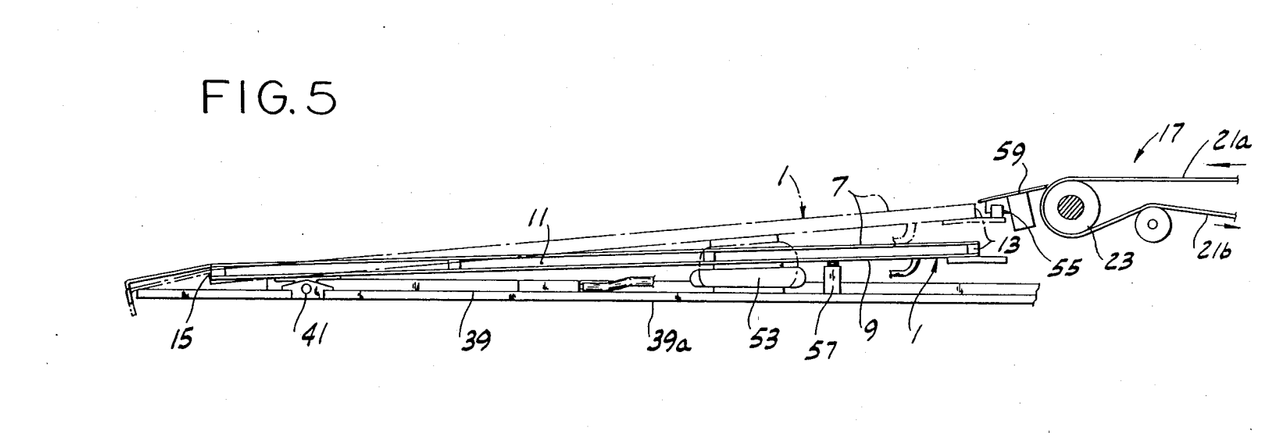
FIG. 5 is an enlarged fragment of FIG. 3, with parts omitted, showing the air table in its lowered position in solid lines and in its raised position in phantom.

The conveyor 17 is mounted in an elevated position on the frame 37 of the apparatus. Bags are delivered endwise to the upper reach 21a of the belt 21 of conveyor 17 over the rearward end of the conveyor by an infeed conveyor 39 (see FIG. 1), which may be the same as that indicated at 30 in the aforesaid U.S. Pat. No. 4,271,755. The air table 1 is supported by means indicated at 39 comprising a plate of substantial thickness which is sufficiently rigid for compression against its bottom face 39a, as will appear, of bags on a pallet. This supporting means or compression plate, or platen as it may be termed, constitutes a carriage for the air table 1, which is pivotally mounted by means indicated at 41 on the platen adjacent the forward end of the table (and the forward end of the platen) for swinging of the table relative to the platen on a generally horizontal transverse axis above the platen between the raised position inclined upwardly toward the rear (e.g. at a 5° angle) in which it is illustrated in solid lines in FIG. 3 and in phantom in FIG. 5, and the lowered position, still inclined upwardly toward the rear but below the raised position (e.g. at a 2° angle), in which it is illustrated in solid lines in FIG. 5 and in phantom in FIG. 3.

The platen 39, carrying the air table 1, is mounted for linear movement back and forth in the longitudinal direction of the conveyor 17 in a generally horizontal plane below the lower reach of the conveyor by means of ball bushings 43 sliding on guide rods 45 carried by the frame 37 of the apparatus, between an advanced position wherein the table extends forward from the exit end of the conveyor 17 with the rearward end of the table adjacent the exit end of the conveyor and a retracted position wherein the platen and the table (in its lowered position on the platen) are below the conveyor 17. Means for effecting this movement of the platen and the table thereon is shown to comprise an air cylinder 47 mounted in horizontal position on the frame 37 of the apparatus having its piston rod 49 connected at 51 to the platen. Means for effecting raising and lowering of the table 1 relative to the platen 39 is shown to comprise air bag means 53 (see FIG. 5) interposed between the platen and the table which, when inflated, raises the table to its raised position, which is determined by engagement of lugs on the table with an upper limit stop 55. On deflation of the air bag means, the table swings down by gravity to its lowered position, which is determined by its engagement with a lower limit stop 57 (see FIG. 5). Conveyor 17 has a bridge 59 (this bridge may also be made air flotation) at its exit end inclined somewhat downwardly in forward directon from the exit end of the upper reach 21a of the conveyor belt 21. When the air table 1 is in its advanced position and also in its raised position, its rearward end 13 is closely adjacent the forward edge of the bridge and its upper surface is generally continuous with the upper surface of the bridge for relatively smooth passage of a bag from the upper reach 21a of the belt 21 over the bridge and on to the table, the bag then sliding down over the table in the direction toward the forward end 15 of the table.

At 61 is generally indicated means for holding a pallet P (and layers of bags stacked thereon) below the stated advanced position of the platen 39 and air table 1, this means comprisng an elevator movable up and down toward and away from the platen 39 in said advanced position for deposit of the layers of bags thereon and for compression of the bags up against the bottom 39a of the platen, as will appear. Means indicated generally at 63 is provided for moving the elevator up and down, the elevator having a fully lowered pallet-receiving position in which it is illustrated in solid lines in FIG. 3. The elevator 61, as illustrated, is similar to that shown in the aforesaid U.S. Pat. No. 4,271,755, comprising a wire mesh conveyor 65 on an elevator carriage or platform 67, with a drive 69 for this conveyor. Reference may be made to said patent for details. The conveyor 65 of the elevator is adapted, when the elevator is in its lowered position, to receive a pallet from a supply stack S of pallets in what may be termed a pallet magazine 71 below the conveyor 17 alongside and closely adjacent the elevator.

The stack S of pallets P in the pallet magazine 71 is supported on a pallet transfer conveyor 73, which may be an endless wire mesh belt conveyor, the upper reach of which is generally coplanar with the upper reach of the elevator conveyor 65 when the latter is down in its stated lowered pallet-receiving position. A drive for the conveyor 73 is indicated at 75. Associated with the pallet magazine is a fork lift mechanism generally indicated at 77 for raising the pallets in the magazine above the lowermost pallet off the lowermost pallet, to allow the latter to be transferred by the transfer conveyor 73 to the elevator conveyor 65. The fork lift mechanism may be essentially the same as that shown in the aforesaid U.S. Pat. No. 4,271,755, and reference may be made thereto for details. The elevator conveyor 65 is operable, when in its lowered position, to discharge a loaded pallet on to an outfeed roller conveyor 79 (corresponding to conveyor 46 of U.S. Pat. No. 4,271,755) as shown in FIG. 1.

Figure 7:
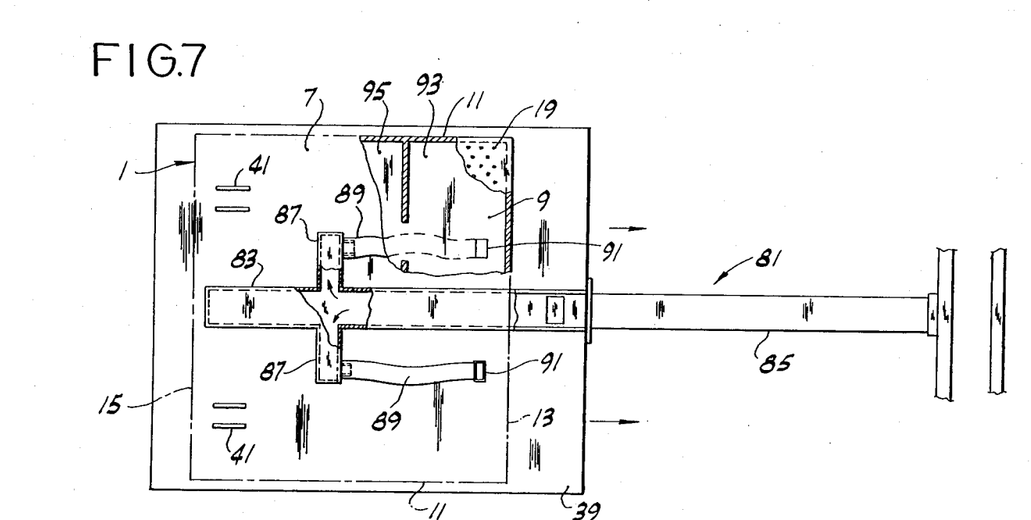
FIG. 7 is a view in plan with parts broken away and shown in section illustrating details of the air supply system for the air table.
Figure 8:
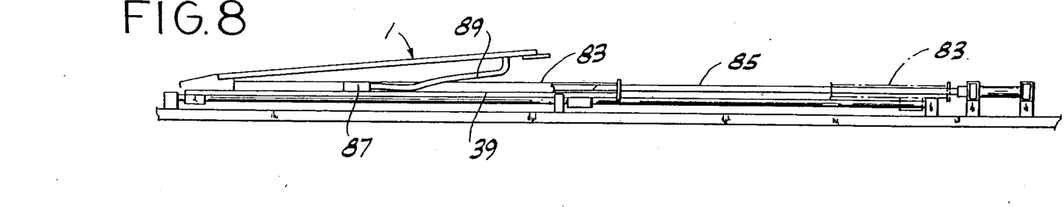
FIG. 8 is a view generally in side elevation of FIG. 7 showing the air supply system.

Means indicated generally at 81 in FIG. 7 is provided for supplying air to the air table 1 accommodating the swinging of the table on its pivot axis at 41, and the movement in translation of the table with the compression plate or platen 39 between their stated advanced and retracted positions. This air supply means comprises an elongate air conduit or plenum 83 secured on top of the platen 39 extending lengthwise thereof (i.e. in the direction of movement thereof), and an elongate fixed air supply conduit 85 mounted on the frame 37 of the apparatus extending lengthwise thereof underneath the conveyor 17 in line with the conduit or plenum 83 on the platen 39. The conduit 85 extends into the plenum 83 through the rearward end of the latter at the rearward end of the platen 39 and has a telescopic sliding sealing fit in the plenum. Extending laterally from the plenum 83 on opposite sides thereof are branch conduits 87 connected by flexible air lines 89 to the air table via ports 91 in the bottom 9 of the table 1. The air space within the table is divided into a series of three compartments or chambers 93, 95 and 97 which extend transversely of the table from the rearward to the forward end of the table by partition means as indicated at 99 and 101 with passages 103 in partition means 99 for passage of air from the first compartment 93 to the second compartment 95, and passages 105 in partition means 101 for passage of air from the second compartment 95 to the third compartment 97. Passages 103 from the first to the second compartment are of larger area than the passages 105 from the second to the third; thus the passages between the successive compartments are of diminishing area for controlling the supply of air from compartment-to-compartment, so that air flows up out of the holes 19 for the second compartment 95 at a lower rate than it flows up out of the holes 19 for the first, and flows up out of the holes for the third compartment 97 at a lower rate than it flows up out of the holes for the second. By suitable selection of the areas of passages 103 and 105 and the supply of air to the plenum, control is effected over the rate at which bags slide down the inclined table, the rate decreasing as the bags pass from a first zone over the first compartment 93 to a second zone over the second compartment, and decreasing further as they pass from the second zone to a third zone over the third compartment for effectively arranging the bags for a layer in the desired pattern.

Figure 4:
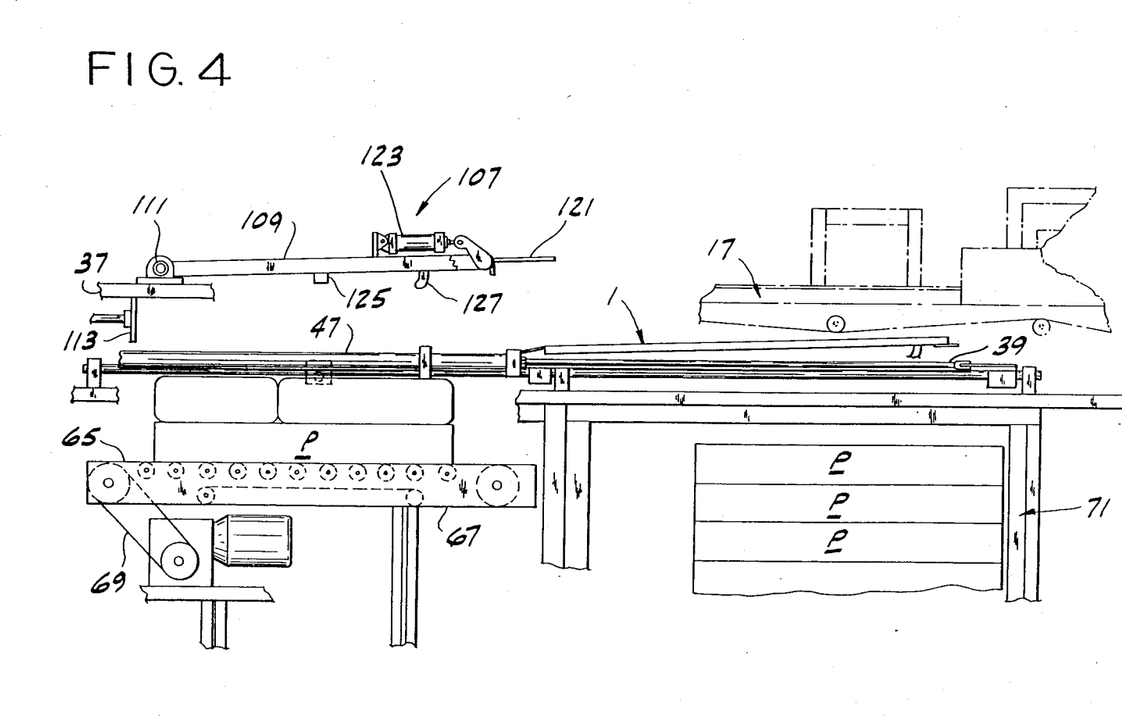
FIG. 4 is a view of the upper part of FIG. 3 showing the air table in its lowered and retracted position for the deposit of a layer of items (filled bags) on a pallet on the raised elevator.

Means indicated generally at 107 (FIGS. 1, 3, 4 and 6) is provided for squaring up a layer 5 of bags 3 on the air table 1, comprising a subframe 109 pivoted at 111 on the main frame 37 of the apparatus for swinging movement in conjunction with the air table. Bags sliding down the table (when the table is in its advanced position and raised) engage an abutment 113 extending across the table adjacent its forward end. This abutment is suitably adjustable as indicated at 115 to different positions for different bag patterns. The pivoted subframe 109 carries a pair of side squaring bars each designated 117 movable toward and away from one another over the table (in its advanced and raised position) at the sides of the table, and a pair of air cylinders 119, one for each of the bars, for moving them in and out. The subframe further carries a pivoted squaring member or flap 121 operable by an air cylinder 123 for movement from a raised retracted position above the table 1 at its rearward end permitting passage of a bag from the conveyor 17 on to the table against the rear of a layer of bags on the table to square the layer in the lengthwise direction of the table against the abutment 113. This flap swings down from its raised retracted position to a downwardly extending position for squaring the layer against the abutment, and in its downwardly extending position it acts as a backstop (see FIG. 3) for holding the layer on the table from moving back with the table when the table is lowered and withdrawn, so that the table is assured of sliding back under the layer and allowing it to drop. The subframe 109 swings up and down between a lowered position (e.g. at a 2° angle) corresponding to the lowered position of the table in a plane generally parallel to that of the lowered table and a raised position (e.g. at a 5° angle) corresponding to the raised position of the table generally parallel to that of the raised table, its lowered position being determined by a suitable stop 125 as diagrammed in FIG. 4. It is lifted back up to its raised position by the table by means such as indicated at 127 in FIG. 4 when the table, in advanced position, is swung up to its raised position.

The air cylinders and the air bag means of the apparatus are controlled by solenoid valves which, with the conveyor drives, the drive for the channelling guide 31, the elevator drive, and the fork lift mechanism drive of the apparatus are under control of a programmable controller means as in the aforesaid U.S. Pat. No. 4,271,755. In the operation of the apparatus, with the air table 1 in its advanced and raised position extending forward from the exit end of the conveyor 17 and inclined downwardly (5° from horizontal) in forward direction as shown in solid lines in FIG. 3 and in phantom in FIG. 4, bags for forming one layer 5 (five bags as herein illustrated) are fed forward by the infeed conveyor 39 one after another to the conveyor 17. As each bag travels forward on conveyor 17, it is channelled and turned, as dictated by the pattern desired for the bags in the layer, by the channelling and turning means 29 for delivery to the air table in the proper position for forming the desired pattern. With the upper surface of the air table generally continuous with the upper surface of the bridge 59 at the exit end of the conveyor 17, each bag (having been oriented as needed by means 29) passes smoothly on to the air table over the rearward end 13 of the table and, in due course, slides down on the table in the direction toward the forward end of the table. The first bags of the pattern (e.g. the first two bags, arranged to extend transversely as shown in FIG. 1) slide down against the abutment 113. With the sequential diminution of the flow of air up out of the holes 19 in the top 7 of the air table from zone-to-zone in forward direction, the sliding of the bags is controlled for relatively gentle handling thereof.

Following the delivery of the last of the five bags on to the air table for the layer of bags being formed, the squaring means 107 is operated to square the layer, this operation involving operation of air cylinders 119 to move the side squaring bars 117 inwardly toward one another for compacting the bags transversely of the table 1 and operation of the air cylinder 123 to swing down the pivoted flap 121 for compacting the bags longitudinally of the table 1 against the abutment 113. The air bag means 53 is deflated to allow the table 1 (with the squared layer of bags thereon) to swing down to its lowered position (shown in phantom in FIG. 3 and in solid lines in FIGS. 4 and 5). As the table swings down, the squaring subframe 109 swings down, the squaring being maintained. The cylinder 47 is then actuated to drive the platen 39 with the lowered table 1 thereon to the retracted position thereof underneath the conveyor 17 shown in FIG. 4. The table is thereby withdrawn from under the squared layer 5 of bags thereon, the layer being positively held against moving rearward with the table by engagement of the rearward end of the layer with the lowered flap 121, and the squared layer is thereby released for deposit on the pallet P on the conveyor 65 on the elevator 61, if it is the first layer of a stack, each succession layer being deposited on the preceding layer on the pallet. For the deposit of the first layer on the pallet on the elevator conveyor 65, the conveyor 65 is raised to bring the pallet to a raised position wherein the top of the pallet is spaced below the platen 39 a distance somewhat greater than the thickness of the layer, to provide for minimum drop of the layer on to the pallet when the air table 1 is retracted. Before the air table 1 and the platen are retracted, the elevator conveyor 65 with the pallet thereon and the first layer of bags on the pallet is raised to compress the layer on the pallet against the bottom face of the platen 39, then lowered to a position wherein the upper surface of the layer on the pallet is spaced below the platen a distance somewhat greater than the thickness of a layer for receiving the next successive layer. The cycle of operation is repeated for each layer, including the step of compression of the layers against the platen after the deposit of each layer, until the pallet is full, i.e. until the desired number of layers has been stacked on the pallet. Then the elevator conveyor 65 is lowered to its lowered position, is operated to deliver the loaded pallet on to the outfeed conveyor 70, and the fork lift mechanism 77 and pallet transfer conveyor 73 are operated to transfer a new pallet from the pallet magazine 71 to the elevator conveyor 65 for the next pallet-loading operation. As is conventional, successive layers of bags are formed with different patterns, alternate layers having the same pattern (see the aforesaid U.S. Pat. No. 4,271,755 for the detail of typical layer patterns wherein there are five bags in each layer).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for stacking items on a pallet in layers each comprising a plurality of the items, said apparatus comprising:

an air table having a forward and a rearward end;

a conveyor for delivering items to the air table over the rearward end of the table for arranging items in a layer on the table, said conveyor having an exit end over which items are delivered to the table;

means supporting the table movable relative to the conveyor between an advanoed position wherein the table extends forward from the exit end of the conveyor with the rearward end of the table adjacent the exit end of the conveyor, and a retracted position wherein the table is below the conveyor;

means for moving the table supporting means and the table between said positions;

means pivotally mounting the table on said table supporting means for swinging of the table on a generally horizontal transverse axis relative to said supporting means when the table is in its said advanced position between a raised position inclined upwardly toward said exit end of the conveyor for receiving items from the conveyor with the rearward end of the table positioned for relatively smooth passage of the items from the conveyor on to the table, items delivered on to the table sliding down on the table in the directon toward its forward end and accumulating in a layer on the table, and a lowered position wherein the table is below the conveyor for the retraction of said table supporting means and said table below the conveyor;

means for effecting pivotal movement of the table to its raised position when in its advanced position for receiving items from the conveyor and pivotal movement of the table to its lowered position when in its advanced position for withdrawing the table from under the layer of items thereon by moving the table, so lowered, from its advanced to its retracted position;

means for holding a pallet and layers of items stacked thereon below the advanced position of the table supporting means and the table, a first layer of items which is arranged on the table being deposited on a pallet held by the pallet holding means when the table is withdrawn and each successive layer being deposited on the preceding layer on the pallet when the table is withdrawn;

said pallet holding means comprising an elevator movable upwardly from a lowered position and back down to its lowered position;

means for holding a supply of pallets below the conveyor and below the retracted position of the table supporting means and the table;

means for delivering a pallet from the supply to the elevator when the elevator is in its lowered position;

said table supporting means comprising a platen against which layers of items on a pallet on the elevator may be compressed when said platen is in the said advanced position;

said table overlying said platen;

the table pivot axis being adjacent the forward end of the table and the corresponding end of the platen.

2. Apparatus as set forth in claim 1 wherein the air table somprises a shallow hollow box having a top, bottom, sides and ends, wherein means is provided for supplying air to the table accommodating the movement of the table along with its said supporting means between said advanced and retracted positions, and also accommodating the pivoting of the table on its said axis, the top of the table having holes for exit of air for airflotation of items for anti-friction sliding thereof on the table.

3. Apparatus as set forth in claim 1 further having means for squaring a layer of bags on the table.

4. Apparatus as set forth in claim 3 wherein the squaring means comprises means swingable in conjunction with the table for squaring the layer on the table with the table in its raised position and maintaining the layer squared on the table when the table is lowered.

5. Apparatus as set forth in claim 3 wherein the squaring means comprises an abutment adjacent the forward end of the table, a squaring frame pivoted for swinging in conjunction with the table between a raised and a lowered position, side squaring means carried by the squaring frame for sidewise compressing a layer on the table, and means carried by the frame engageable with the rearward end of the layer for compressing it against the abutment and being movable to a retracted position permitting passage of bags from the conveyor on the table.

6. Apparatus for stacking items on a pallet in layers each comprising a plurality of the items, said apparatus comprising:

an air table having a forward and a rearward end;

a conveyor for delivering items to the air table over the rearward end of the table for arranging items in a layer on the table, said conveyor having an exit end over which items are delivered to the table;

means supporting the table movable relative to the conveyor between an advanced position wherein the table extends forward from the exit end of the conveyor with the rearward end of the table adjacent the exit end of the conveyor, and a retracted position wherein the table is below the conveyor;

means for moving the table supporting means and the table between said positions;

means pivotally mounting the table on said table supporting means for swinging of the table on a generally horizontal transverse axis relative to said supporting means when the table is in its said advanced position between a raised position inclined upwardly toward said exit end of the conveyor for receiving items from the conveyor with the rearward end of the table positioned for relatively smooth passage of the items from the conveyor on to the table, items delivered on to the table sliding down on the table in the directon toward its forward end and accumulating in a layer on the table, and a lowered position wherein the table is below the conveyor for the retraction of said table supporting means and said table below the conveyor;

means for effecting pivotal movement of the table to its raised position when in its advanced position for receiving items from the conveyor and pivotal movement of the table to its lowered position when in its advanced position for withdrawing the table from under the layer of items thereon by moving the table, so lowered, from its advanced to its retracted position; and means for holding a pallet and layers of items stacked thereon below the advanced position of the table supporting means and the table, a first layer of items which is arranged on the table being deposited on a pallet held by the pallet holding means when the table is withdrawn and each successive layer being deposited on the preceding layer on the pallet when the table is withdrawn;

the air table comprising a shallow hollow box having a top, bottom, sides and ends;

means for supplying air to the table accommodating the movement of the table along with its said supporting means between said advanced and retracted positions, and also accommodating the pivoting of the table on its said axis;

the top of the table having holes for exit of air for airflotation of items for anti-friction sliding thereof on the table; and means for controlling air distribution in the table for lower flow from the holes toward the forward end of the table than from the holes toward the rearward end of the table.

7. Apparatus as set forth in claim 6 wherein the air is introduced into the table from the bottom adjacent its rearward end and the air distribution controlling means comprises means defining a series of compartments extending transversely of the table from the rearward to the forward end of the table, with passages betwen successive compartments of diminishing area.

8. Apparatus for stacking items on a pallet in layers each comprising a plurality of the items, said apparatus comprising: an air table having a forward and a rearward end;

a conveyor for delivering items to the air table over the rearward end of the table for arranging in a layer on the table, said conveyor having an exit end over which items are delivered to the table;

means supporting the table movable relative to the conveyor between an advanced position wherein the table extends forward from the exit end of the conveyor with the rearward end of the table adjacent the exit end of the conveyor, and a retracted position wherein the table is below the conveyor;

means for moving the table supporting means and the table between said positions;

means mounting the table on said table supporting means with the table overlying said supporting means and for movement of the table relative to the supporting means when the table is in its said advanced position between a raised position inclined upwardly toward said exit end of the conveyor for receiving items from the conveyor with the rearward end of the table positioned for relatively smooth passage of the items from the conveyor on to the table, items delivered on to the table sliding down on the table in the directon toward its forward end and accumulating in a layer on the table, and a lowered position wherein the table is below the conveyor for the retraction of said table supporting means and said table below the conveyor;

means for effecting movement of the table to its raised position when in its advanced position for receiving items from the conveyor and movement of the table to its lowered position when in its advanced position for withdrawing the table from under the layer of items thereon by moving the table, so lowered, from its advanced to its retracted position;

means for holding a pallet and layers of items stacked thereon below the advanced position of the table supporting means and the table, a first layer of items which is arranged on the table being deposited on a pallet held by the pallet holding means when the table is withdrawn and each successive layer being deposited on the preceding layer on the pallet when the table is withdrawn;

said pallet holding means comprising an elevator movable upwardly from a lowered position and back down to its lowered position;

means for holding a supply of pallets below the conveyor and below the retracted position of the table supporting means and the table;

means for delivering a pallet from the supply to the elevator when the elevator is in its lowered position; and said table supporting means when in its advanced position overlying the elevator and positioned for engagement of the bottom thereof by the top layer of items on a pallet on the elevator when the elevator is raised and acting as a compression member for compression of the layers of items on the pallet on the elevator.

* * * * *